US006853851B1

(12) United States Patent
Rautiola et al.

(10) Patent No.: US 6,853,851 B1
(45) Date of Patent: Feb. 8, 2005

(54) DUAL MODE TERMINAL FOR ACCESSING A CELLULAR NETWORK DIRECTLY OR VIA A WIRELESS INTRANET

(75) Inventors: Markku Rautiola, Tampere (FI); Jussi Lemilainen, Arlington, MA (US); Markku Niemi, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/646,419

(22) PCT Filed: Mar. 18, 1999

(86) PCT No.: PCT/IB99/00555

§ 371 (c)(1),
(2), (4) Date: Nov. 30, 2000

(87) PCT Pub. No.: WO99/48315

PCT Pub. Date: Sep. 23, 1999

(30) Foreign Application Priority Data

| Mar. 18, 1998 | (GB) | 9805736 |
| Mar. 19, 1998 | (FI) | 980623 |
| Mar. 19, 1998 | (GB) | 9805843 |
| Sep. 16, 1998 | (FI) | 981995 |

(51) Int. Cl.[7] .............................................. H04M 1/00
(52) U.S. Cl. .................................. 455/553.1; 455/426.1
(58) Field of Search .......................... 455/426.1, 426.2, 455/466, 454, 552.1, 553.1, 554.1, 554.2, 555, 556.1, 557, 560

(56) References Cited

U.S. PATENT DOCUMENTS 5,706,331 A * 1/1998 Wang et al. .................. 379/58
5,790,953 A * 8/1998 Wang et al. ................. 455/435
6,285,757 B1 * 9/2001 Carroll et al. ............... 379/433
6,295,461 B1 * 9/2001 Palmer et al. .............. 455/557
6,326,613 B1 * 12/2001 Heslin et al. ............... 250/239
6,405,049 B2 * 6/2002 Herrod et al. .............. 455/517

FOREIGN PATENT DOCUMENTS

| AU | 724249 | 11/1997 |
| EP | 0 735 789 A2 | 10/1996 |
| EP | 0 766 427 A2 | 4/1997 |
| GB | 2 292 047 A | 2/1996 |
| GB | 2 316 581 A | 2/1998 |
| GB | 2 327 016 A | 1/1999 |
| WO | WO 95/33348 | 12/1995 |
| WO | WO 97/34429 | 9/1997 |
| WO | WO 97/36442 | 10/1997 |
| WO | WO 98/09455 | 3/1998 |
| WO | WO 98/10617 | 3/1998 |
| WO | WO 98/15143 | 4/1998 |

* cited by examiner

*Primary Examiner*—Charles Craver
(74) *Attorney, Agent, or Firm*—Antonelli, Terry, Stout & Kraus, LLP

(57) ABSTRACT

A wireless intranet office (WIO) concept is disclosed, which integrates an IP based intranet environment (27) and GSM network providing mobile telephones (21) with access to GSM through the GSM network or via the intranet. Access through the intranet to the GSM MSC (26) is provided by a WIO interworking unit (24) which may comprise several network entities (e.g. intranet mobile cluster (241), intranet location register (242), WIO gatekeeper (243), WIO gateway (244) and H.323 gateway). A dual mode terminal for such a system is also disclosed.

9 Claims, 15 Drawing Sheets

DUAL MODE TERMINAL FOR ACCESSING A CELLULAR NETWORK DIRECTLY OR VIA A WIRELESS INTRANET

The present invention relates to a dual mode mobile station operable, for example in a public mobile communication network and a private network. The invention also relates to the system in which such a dual mode terminal may operate, and further components of that system.

In modern office work it is necessary to provide the employees with versatile information transfer connections which can transfer speech, facsimile messages, electronic mail and other data—usually in digital form. Transfer of information is needed inside an office or corresponding working environment for communication between employees, for transfer of information between branch offices of an enterprise, which offices can be in other towns or even in other countries, and for communication between the office and "outside world". In this text and all of the following text "office" stands for an environment with several users, which users "belong together", and which office physically covers a reasonably limited area. There has been a trend in the telecommunication branch toward integrated systems in which various forms of telecommunication can be controlled as one entity.

A conventional realization of an above mentioned type of office communication system comprises a company telephone exchange for providing telephone services and telephones connected to it over twisted-pair connections and a separate local area network (LAN) in which applications for advanced telecommunication services have been implemented and which has the intelligence to run them. The local network is connected to the telephone exchange using a telecommunication server (Telephony Server) which supports the traditional subscriber server architecture in which subscribers are subscribers' computers connected to the local network. For example call-, data-, facsimile-, electronic mail- and speech mail services are connected within an office utilizing the telecommunication server. In an integrated system users can also e.g. control telephone services using their computer terminals connected to the local network. The whole integrated office communication system is connected to public telephone network through the telephone exchange.

FIG. 1 presents an example of a prior known office communication system in which users' telephones TP (TelePhone) have been connected by wire connections and a local area network (LAN) has been connected over a telecommunication server TS (Tele Server) into a telephone exchange PBX (Private Branch Exchange) which is connected to a public telephone network PSTN/ISDN (PSTN, Public Switched Telephone Network, ISDN, Integrated Services Digital Network). To the local area network (LAN) have been connected on one hand servers executing various services such as data base server DBS (Data Base Server), voice server VS (Voice Server) and electrical mail server EMS (Electrical Mail Server) and on the other hand the users' computers PC (Personal Computer). It can be regarded as a problem with this kind of realization that even if a user's telephone TP and computer PC usually are on the same table next to each other separate wire connections must be laid to the user's working room for them, on one hand from the telephone exchange PBX and on the other hand from the telecommunication server TS of the LAN. Building and maintenance of two overlapping telecommunication networks naturally causes cost.

The problem of overlapping telecommunication networks is increased by portable mobile stations utilizing radio connection coming rapidly more popular. Many persons working in an office need, because of their mobile work, a mobile station and often also a portable facsimile device and/or a combined portable computer/mobile station. In order to be able to use the devices based on radio connection also inside buildings, the constructions of which attenuate radio signals, it has been suggested that mobile radio networks should be supplemented with small base stations individual for offices even for rooms, which base stations would be connected either directly or over wired telephone network to the central systems of mobile communication network. The network of small base stations would be already a third overlapping telecommunication network within the same office, and accordingly it is clear that in a preferable solution, which the present invention is aiming at, also the arrangement supporting radio communication stations should be realized using essentially the same means and telecommunication networks than the rest of the transfer of information in the office.

A challenge of its own to telecommunication systems is issued by the fact that work is done more and more in small office or domestic environment, which is described by the concept SOHO (Small Office, Home Office). Even here advanced office communication services are often needed and it is particularly preferable if such a flexible system is available which can be utilized even both in the office and at home. The present systems which require overlapping connections for the utilization of mobile communication services, conventional telephone services and fast data transfer services are very inflexible for working in a small- or home office. In addition to above, the following kinds of solutions connected with integrated telecommunication systems are known from prior art.

If an integrated office communication system is realized utilizing traditional technique, separate wired connections must be laid into a user's working room on one hand from telephone exchange PBX (FIG. 1) and on the other hand from telecommunication server TS of local area network (LAN). Constructing and maintaining two overlapping networks naturally brings extra cost. In said solutions according to prior art a solution to this problem has not actually been striven for.

A target of the present invention is to present a system which reduces the problems caused by overlapping networks. Additionally, the purpose of the invention is to reduce problems caused by wireless information transfer inside an office and extra cost. A further target of the invention is to present an arrangement, in which said system, integrating information transfer can also serve home office- and small office users. A further target of the invention is to present an arrangement of said kind, in which the same devices can be used as terminal devices (e.g. mobile stations) in the telecommunication system both in the office and outside it.

According to an aspect of the present invention, there is provided a dual mode mobile station comprising means for managing network information independently of the mode of operation of the mobile station; first linking means for linking to the interface of a mobile communication network so as to transfer control and mobility information between the mobile station and the mobile communication network; second linking means for providing a link to the interface of a further communication network so as to transfer control and mobility information between the mobile station and the further communication network; and means for coupling the managing means to the first linking means when the mobile station is in a first mode and to the second linking means when the mobile station is in the second mode.

This mobile station has common network layer information for both modes (i.e. when the mobile station is within and outside the wireless intranet office environment). Consequently, as there is no dual stack at this level, less code is required to implement the dual mode mobile station, hence making it simpler, faster and cheaper. It is also easy to implement the second mode into existing mobile stations as this may be provided by virtue of a software enhancement to the conventional mobile station.

The network information is preferably at least mobile communication call control and mobility information. It may also further comprise mobile communication radio resources information. However, alternatively, the first linking means may comprise a radio resource manager for the mobile communication network, and the second linking means may comprise a radio resource manager for the further communication network. This may enable the mobile station to communicate with an interface on the further communication network by means of simple signalling. For example, the second linking means may comprise a radio resource of an unlicensed band such as a low power RF radio resource like Bluetooth.

In a preferred embodiment, the mobile station is further provided with a radio resource manager for a user terminal, and linking means for linking to the interface of the terminal device so as to transfer radio resource information between the mobile station and the user terminal. Furthermore, a mobile station may further comprise a browser, such as a WAP browser.

According to another aspect of the invention, there is provided a base station transceiver emulator for interfacing a mobile station of a mobile communication network and a further communication network, the base station transceiver emulator comprising means for determining the presence of a mobile station within its cell; transceiving means for receiving call transfer information from the mobile station when the mobile station is within the cell and for transmitting call transfer information to the mobile station as it prepares to leave the cell.

According to a further aspect of the invention, there is provided a mobile station emulator for interfacing a mobile station of a mobile communication network and a base transceiver station emulator of a further communication network, the mobile station emulator comprising means for receiving call transfer information from the mobile station and for forwarding it to the base transceiver station emulator, when the mobile station enters the cell of the base transceiver station emulator; means for maintaining the call transfer information while the mobile station is within the cell; and means for transmitting the call transfer information to the mobile station as it prepares to leave the cell.

Such an emulator enables simple signalling between the mobile station and base station transceiver emulator. Furthermore, it enables call forwarding. Moreover, it eliminates the need for a mobile station to be used once it has entered the wireless intranet office environment. For example, instead of using a mobile station when in the office environment, a user could use a lightweight terminal such as a wristwatch and headset instead, or indeed a PC with headset.

A device for coupling a mobile station of a mobile communication network to a further communication network may comprise a base transceiver emulator and/or a mobile station emulator. Preferably, the device is a personal base unit and comprises both of these emulators. Such a personal base unit may be implemented in a PC.

According to another aspect of the present invention, there is provided a system for transferring information between a mobile station and a further communication device, the system comprising he mobile station, a communication network to which the further communication device is coupled, and a base transceiver station emulator for interfacing the mobile station and the communication network, wherein the system transfers information over the communication network when the mobile station is within the cell of the base transceiver station emulator, and transfers information over a mobile communication network when the mobile station is outside the cell of the base transceiver station emulator.

A base transceiver station emulator and mobile station are also provided for such a system.

Such a system allows users to utilise communication networks, such as private intranets to carry cellular services (eg speech, data, SMS, facsimile etc) when within a coverage area. In addition, the WIO concept provides a good platform for local multimedia extensions because it potentially offers higher bandwidth to the user. Access to the public cellular network (eg GSM) is offered by introducing a transparent location management method, which allows mobile stations connected to the communication network, such as the intranet, to be reached from the public cellular network in the normal way. Hence, the concept can be utilised to provide extra capacity in hot-spot areas, such as airports and malls.

The base transceiver station (BTS) emulator may be an actual base transceiver station or a virtual base transceiver station. In any event, it is an interface between the mobile station and the communication network over which the information (eg, speech, data) is to be transmitted.

The BTS emulator may be the BTS of a mobile cluster. In this event, it is an actual base transceiver station. Whilst a mobile station is within this BTS cell, the information to/from the mobile station is transmitted over the communication network, even if there is an overlap with the cell of another public GSM BTS.

Alternatively, the BTS emulator may form part of a personal base unit for a mobile station, in which case it is a virtual BTS. That is, it looks like a BTS to the mobile communication network, but does not handover to another BTS.

In one embodiment, where the communication network is an IP network, the system takes care of the binding of GSM and IP numbers, so that only one number is required. Such E.164=IP# mapping may be performed in the IWU (e.g. by the gatekeeper or ILR, or alternatively in the personal base unit.

The communication system may be one of several kinds, such as a data communication network, internet, intranet, LAN, WAN, ATM packet network, Ethernet™, or Token Ring™. Also, the further communication device may be one of several kinds, including a PBU, another mobile station, an MSC or an FSC.

The mobile station and PBU may be connected by RS232 cable. Alternatively, they may have an RF (preferably LPRF) or infrared connection. Examples include Bluetooth, Home RF, 802.11 WLAN etc. Also, they may be indirectly connected, for example via a connection device such as a mobile station cradle, deskstand or charger, or even a LAN of some kind.

According to another aspect of the present invention, there is provided a dual mode mobile station comprising control means for controlling transfer of information such that in a first mode transfer of information is between the mobile station and a mobile communication network, and in a second mode transfer of information is between the mobile station and a second communication network, and means for providing radio contact between the mobile station and the mobile communication network in both the first and second modes.

The first mode is, for example, when the mobile station is outside the office environment and the second, when it is within it.

In a preferred embodiment, the control means and means for providing radio contact are realised by virtue of a software enhancement to conventional mobile terminals. Hence, the terminals are much simpler than existing dual mode terminals, which, for example, require switches to change between the modes. Also, the terminal of the present invention remains connected to the mobile network while the actual data (data/speech etc.) is carried over another interface. Thus it provides the mobile network with what seems to be the same operation specified for the standard mobile communication network entities.

Now a system has been invented for transfer of information, e.g. speech or data, in which the trunk of information transfer is inside the office a local network (e.g. local area network, LAN), and between office units e.g. a traditional telephone network utilizing wired connections or a fast data packet network utilizing ATM (Asynchronous Transfer Mode) technique, for example According to one embodiment of the invention the mobile station may be connected to the terminal device by means of a connection device, having a functional connection to the terminal device, and having means for connecting functionally to the mobile station. In response to connecting a mobile station to the connection device, the system will be informed to direct calls to the mobile station via the data communication network. The connection device can be a desktop stand or desktop charger and may be a separate device or integrated into the terminal device.

A subscriber device means a terminal device connected to a telecommunication network, such as a telephone connected to a fixed telephone network, and a mobile station connected to a mobile communication network. A subscriber device also means servers and telephone exchanges connected to telecommunication networks, providing telecommunication services to the users of the telecommunication networks. In other words, a subscriber device means all the parts of a telecommunication network with which a telecommunication terminal device (e.g. a telephone) can communicate over a telecommunication network.

Embodiments of the present invention will now be described, by way of example, with reference to the accompanying drawings, of which:

FIG. 1 presents traditional communication networks and terminal devices used in an office environment;

Figure 14:
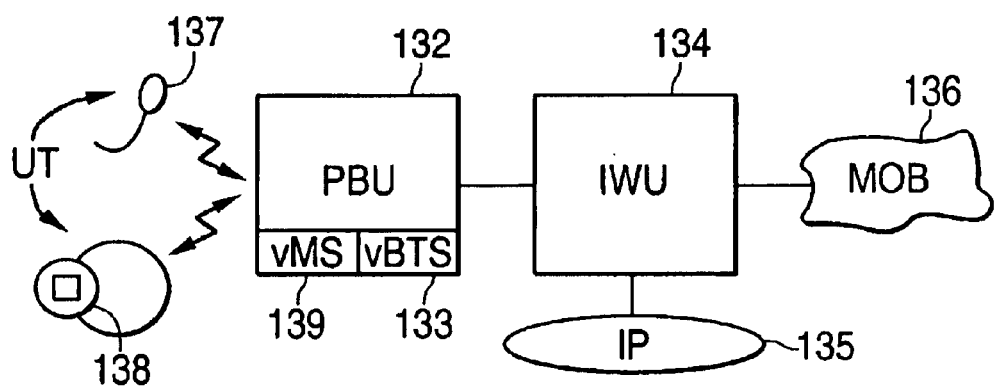
Figure 15:
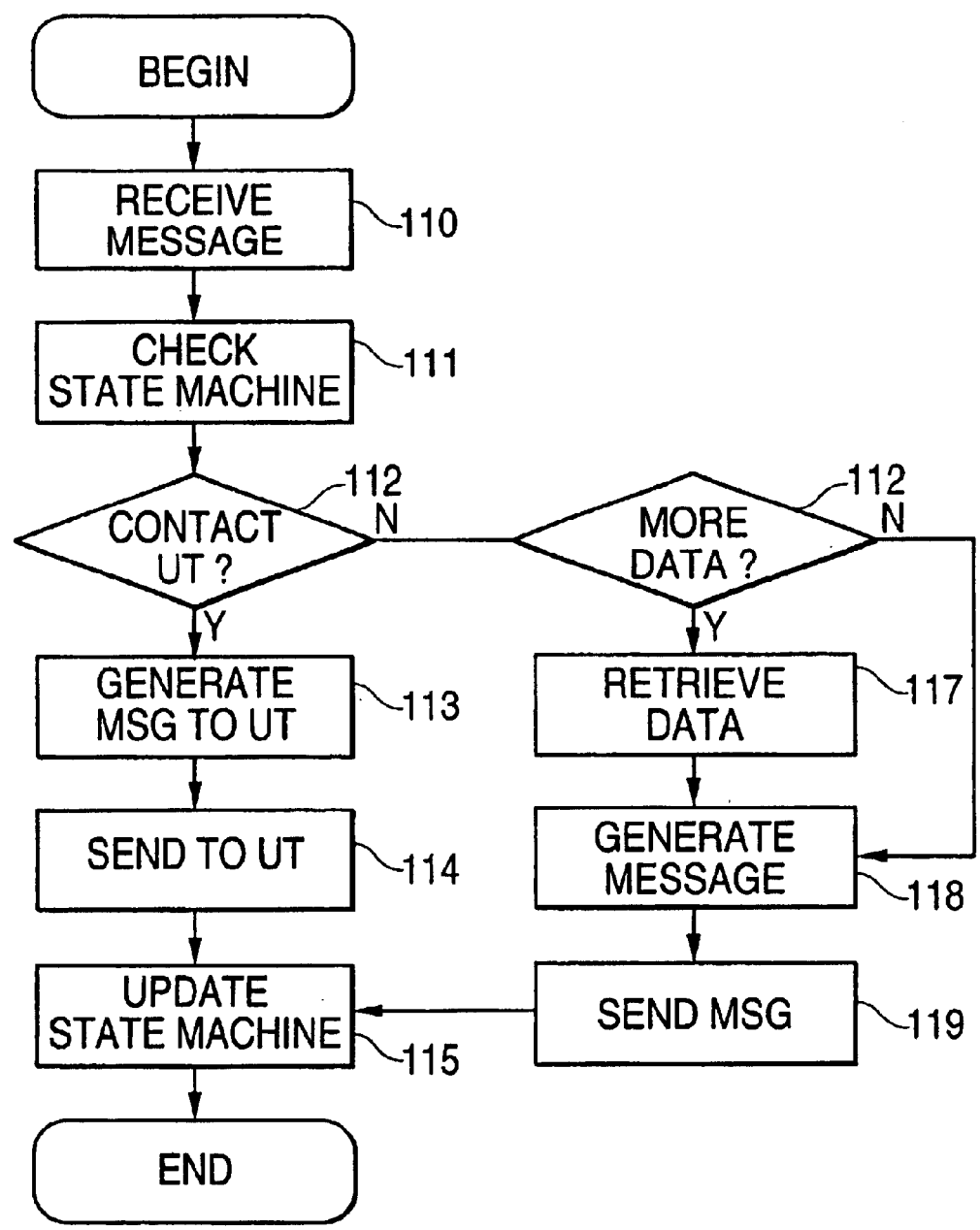
Figure 16:
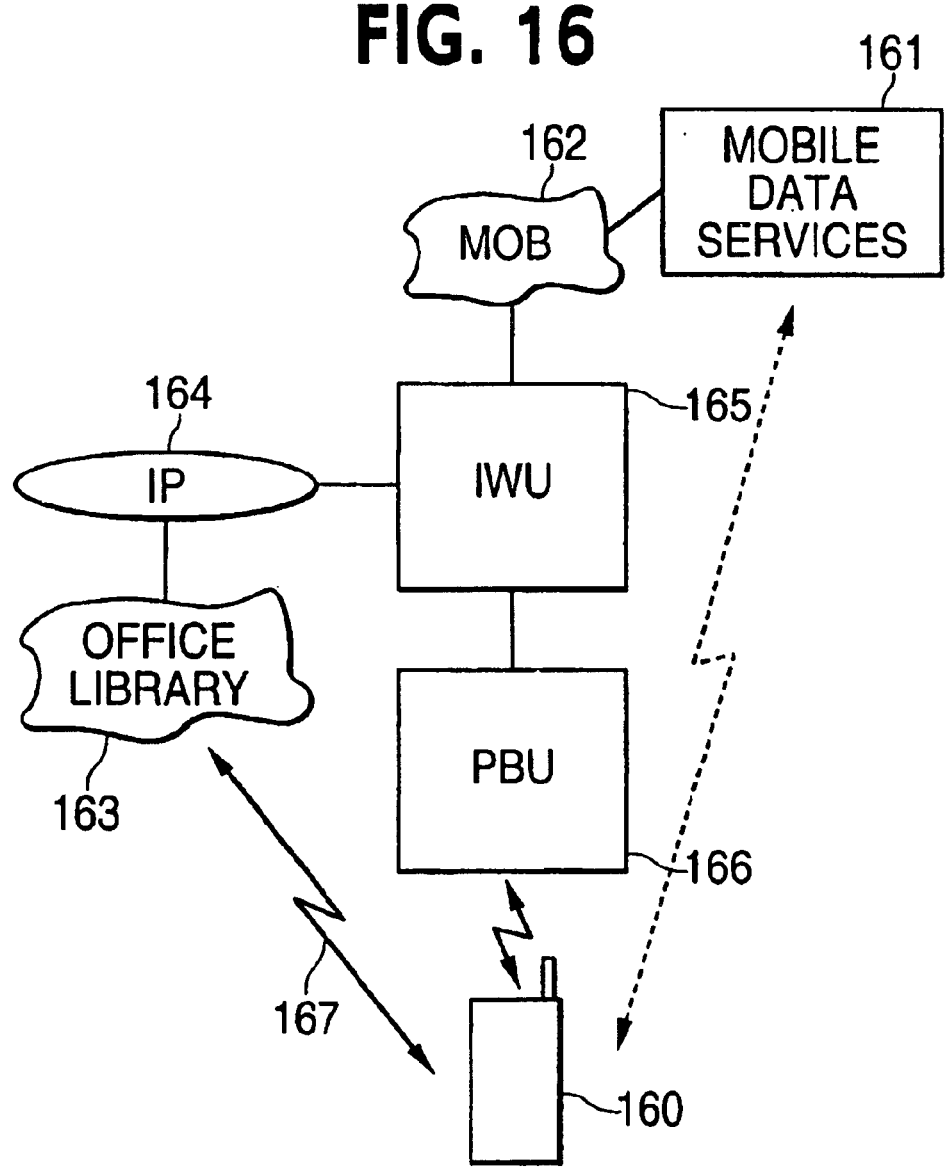

FIG. 14 illustrates a wireless intranet office system according to a further embodiment of the present invention, in which the user is provided with a handsetless user terminal which communicates directly with the personal base unit; and FIG. 15 is a flow chart illustrating the functioning of a virtual terminal in the embodiment of FIG. 14, and FIG. 16 illustrates the handling of an electronic book service within a wireless intranet office.

As can be seen, the wireless intranet office integrates an IP based private intranet environment with a public cellular network, in this case the GSM network. This allows cellular users to utilise private intranets to carry the cellular services (ie speech data SMS facsimile etc.) within the intranet coverage area. In addition, the wireless intranet office architecture provides a good platform for local multimedia extensions because it potentially offers higher bandwidth to the user. Access to public GSM network is offered by introducing a transparent location management method, which allows terminals connected to the intranet to be reached from the public GSM network in the normal manner. Thus, the wireless intranet office arrangement can be utilised to provide extra capacity in hot spot areas, such as airports, malls etc., where this might be needed.

In this wireless intranet office arrangement, the intranet forms a new kind of access network to the GSM network. The communication between the GSM backbone network and the end user access node takes place via internet protocol based networks instead of the GSM air interface, as will be seen below.

Figure 1:
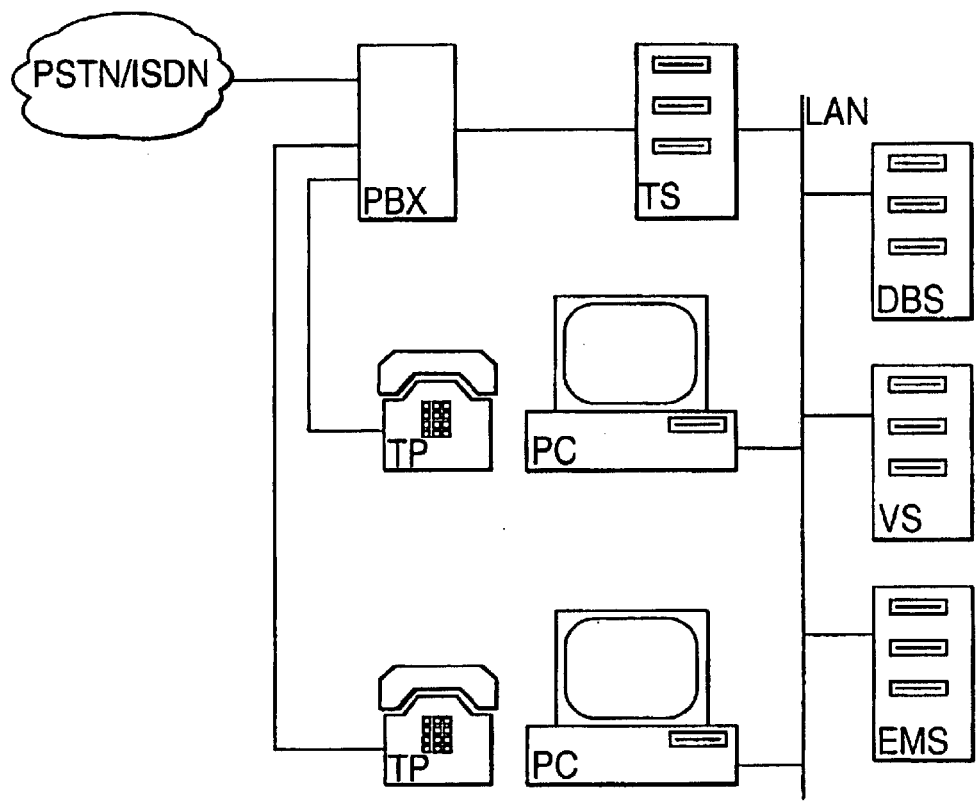
Figure 2:
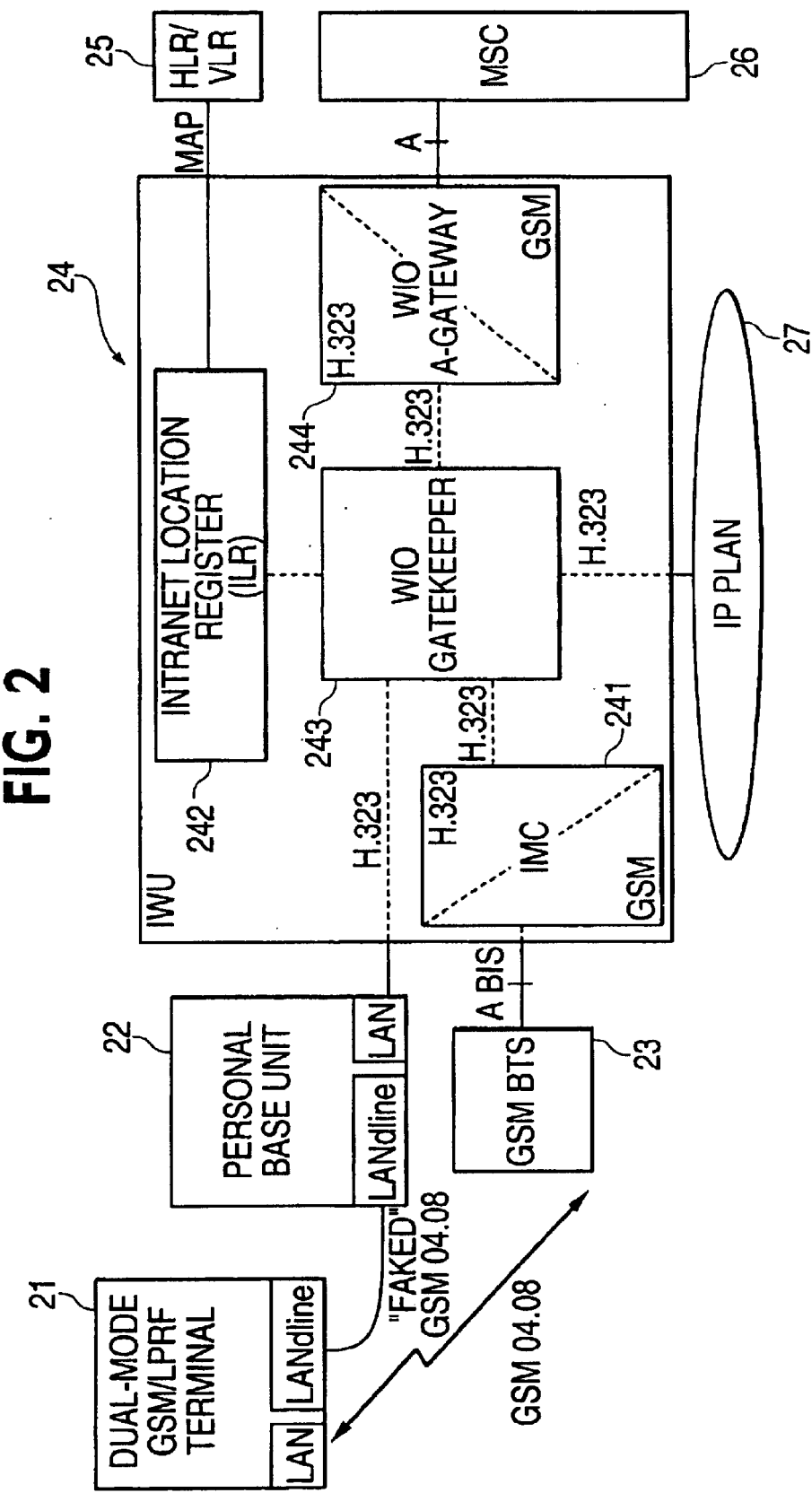
FIG. 2 illustrates a wireless intranet office architecture according to an embodiment of the present invention.

FIG. 2 shows a mobile station 21 in a wireless intranet office environment. When outside this environment, the mobile station acts as a normal GSM phone connecting to a BTS of a public GSM network. However, when in the wireless intranet office environment, the mobile station may operate in one of two modes. In one mode, it connects to a personal base unit 22 (eg either with a inter-connection cable, a infra-red connection, or with low power RF transmitter and receiver), and in another mode connects to a GSM base transceiver station (BTS) 23. The mobile station 21 is connected to an IP local area network (LAN) and a home location register (HLR) and visitor location register (VLR) 25 and a mobile station controller (MSC) 26 by virtue of an inter-working unit (IWU) 24. This IWU comprises several network entities, including an intranet mobile cluster (IMC) GSM/IP Gateway 241, an intranet location register (ILR) 242, a WIO gatekeeper 243 and a WIO A-gateway 244.

Information such as data and/or speech may be transferred from the mobile station to the IP local area network by 2 routes, each of which includes a BTS emulator. In a first mode, the mobile station 21 is connected to the local area network via a personal base unit 22 (PBU), which itself comprises a virtual BTS. This is further explained with reference to FIG. 4 below.

Figure 3:
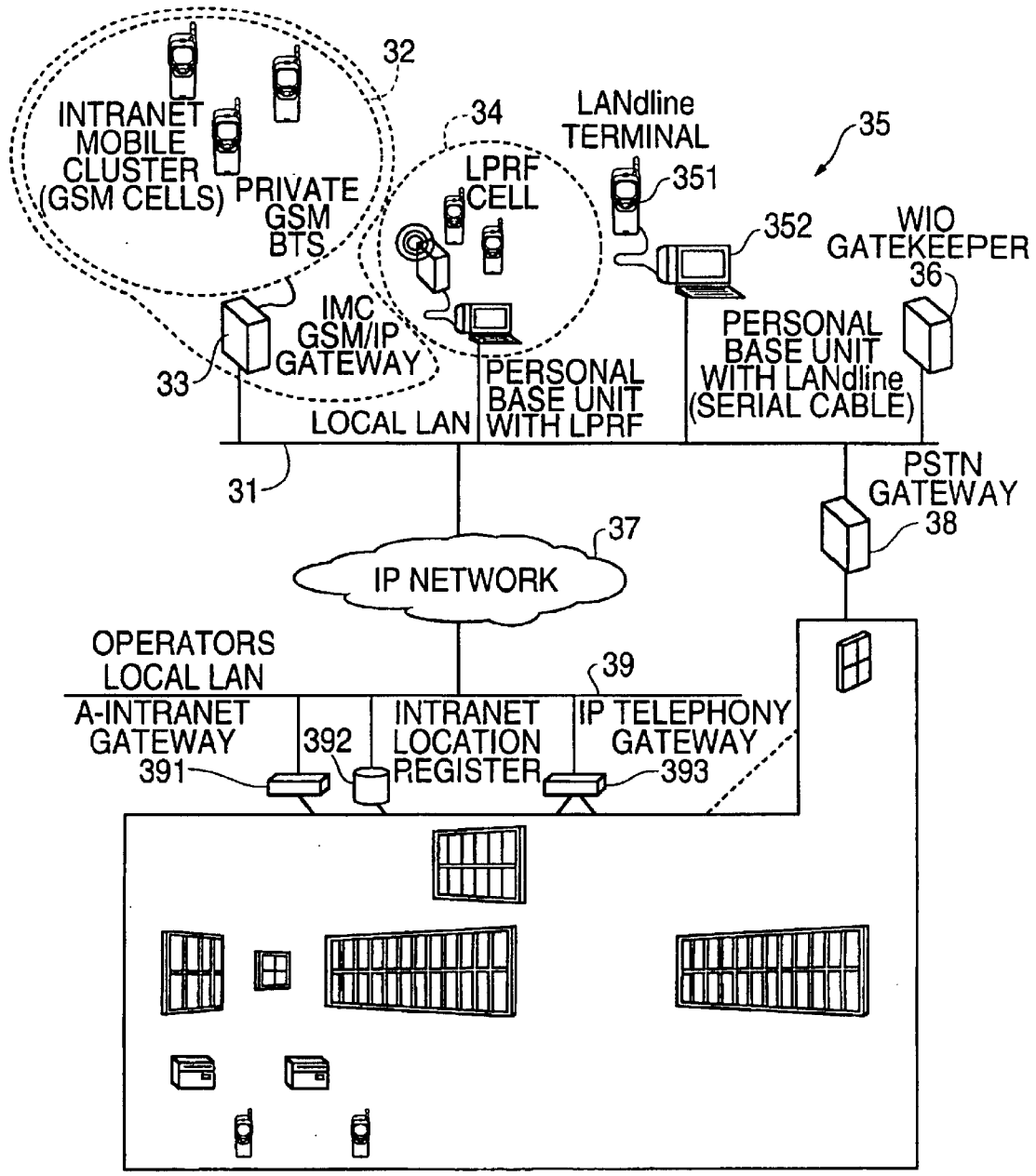
FIG. 3 illustrates a wireless intranet office architecture according to an embodiment of the present invention.

In a second mode, the mobile station 21 forms part of a mobile cluster (for example see reference 32 in FIG. 3). In this case, the information is transmitted to the local area network via a private GSM BTS 23 dedicated to that cluster, and an IMC GSM/IP Gateway 241. The BTS transmits the signal over the A bis interface, and the IMC Gateway 241 performs a protocol transform from GSM to H.323, so that the signal can be transmitted over the IP local area network. (As can be seen from this figure, the wireless intranet office architecture uses the H.323 protocol for the signalling and data connections inside the inter-working unit).

The basic access interfaces to the cellular network are the air interface, the A-interface, the MAP protocol, the ISUP/

TUP interface and the DSS.1 interface. The A-interface is an interface to mobile switching centre and the MAP interface is an interface to HLR/VLR. ISUP/TUP interface connects switching centres, while the DSS.1 interface resides in between of the BSX and switching center, The air interface connecting mobile terminals to the network can be any RF interface or infrared link. Candidate RF interfaces include e.g. Low Power RF (LPRF), 802.11, wireless LAN (WLAN) WATM and HIPERLAN. The air interface can also be replaced with a physical connection (e.g. RS-232 serial cable or Universal Serial Bus (USB). The GSM network sees this new access network as a BSS entity. New network entities are added to the access network to modify/de-modify cellular signalling. System design principle is to fulfill ITU-T's recommendation H.323 and enhances it with mobility extensions.

The WIO A-gateway 244 looks like a base station controller to the MSC 26.

A general WIO network architecture is shown in FIG. 3. A local area network 31 is provided with an intranet mobile cluster IMC 32, an LPRF cell 34 and a landline connection 35, The IMC comprises a plurality of mobile stations, a BTS (private GSM BTS) and a server in the form of an IMC GSM/IP gateway. The BTS interface between the BTS and IMC GSM/IP gateway is a GSM A-bis interface. The IMC GSM/IP gateway is responsible for signalling conversions between the GSM and H.323 protocols. The low power RF cell 34 comprises a personal base unit which has a virtual BTS and a low power transceiver, and associated mobile stations with corresponding low power RF transceivers. The PBU is directly connected to the WIO network. To provide the mobile stations with access to the GSM network, the PBU provides conversions between the GSM and H.323 protocols. These conversions can be seen as a bridge a between cellular phone and H.323 features which support WIO location management and mobility features. The landline connection comprises a landline terminal 351 hardwired to a personal base unit 352, which in turn is hardwired to the local area network.

Also connected to the local area network are a WIO gatekeeper 36, which is responsible for the connection of mobile stations to within and outside the network. For example it might transfer a call from the server to an external system such as PSTN (via gateway 38) or it could provide connection to the IP network 37. The IP network, in turn, is connected to the operators local area network 39, This local area network is provided with an A-intranet gateway 391, an intranet location register 392 and IP telephony gateway 393.

In this embodiment the main function of the Intranet Location Register is to store mobility management information and call statistics of the subscribers configured into the Wireless Intranet Office system. Roaming of visitors are controlled by the mobile switching center. For visitors only temporary information will be stored into the Intranet Location Register.

The ILR has a MAP interface to cellular system network HLR 25.

The IP Telephony Gateway 393 in this embodiment supports interworking between internet telephony endpoints and mobile stations in the public cellular network, The interworking is based on the H.323 specifications.

The A-Intranet Gateway 391 in this embodiment makes protocol conversion between SCCP/MTP and IP protocols at the A-interface, and makes the cellular and Intranet location area associations. It has an O&M software entity which operates as an administrative server gateway for corresponding agents in intranet Mobile Clusters. The A-Intranet Gateway operates as a firewall between public telecommunication network and private Intranet solutions.

Further explanation of the network entities in FIGS. 2 and 3 are outlined below.

The Intranet Mobile Station is a generic terminal product portfolio consisting of full-featured cellular phone which support services of GSM and GSM derivatives. It may have specific features such as extended office/home cell selection criterias, and support of office and home area priority. With a serial cable and with a piece of software to a PC, Intranet Mobile Station—so called LANdline version—enables seamless landline communication to cellular system network and between other Internet telephony entitles within IP network. It may be a GSM/LPRF dual-mode device enabling high value services within certain service areas.

The Personal Base Unit (PBU) may be a PC Card type of radio card for a desktop PC with a piece of software enabling wireless access to IP network. It provides LPRF cordless and wireless LAN—on 2.4 GHz band—dual-node access exploiting an unlicensed radio spectrum. In cordless, "unlicensed" mode lower layers will be replaced with new ones, but signalling above them remains the cellular one. It also enables intelligent roaming of terminals between different radio frequency bands, i.e. between cellular and unlicense bands.

The Intranet Mobile Cluster is simulating BSC in a local environment. It consists of minimum set of BTS functionality with reduced physical construction. Intranet Mobile Cluster is a BTS and a BTS driver software package for Windows NT 5.0 including rate adaptation, an O&M agent software package and a GSM/IP Telephony Gateway entity, Intranet Mobile Cluster provides interworking with data services and facsimile as a direct access to IP network, and it may provide local call routing capability within its radio coverage.

The purpose of the GSM/IP Telephony Gateway is to reflect the characteristics of an Internet telephony endpoint to an Intranet Mobile Station, and the reverse, in a transparent fashion. The GSM/IP Telephony Gateway provides appropriate format translation of signalling and speech, i.e., audio format translations between GSM 06.10, 06.20, 06.60, J-STD-007 and G.711, G.723 and transformation of communications procedures, The Gateway performs call setup and clearing on both the Internet telephony side and the Wireless Intranet Office side.

The MS-IP (WIO) Gatekeeper 36,243 provides mobility and call management services, and certain radio resource management functions.

The MS-IP Gatekeeper provides the following services:

Registration control—The MS-IP Gatekeeper authenticates all the network entities, i.e., Intranet Mobile Stations, Intranet Mobile Clusters, A-Intranet Gateways, IP Telephony Gateways, Intranet Location Registers, H.323 terminals, which have access to the system. In case of Intranet Mobile Station, authentication and registration is based on automatic Gatekeeper discovery procedure. In other cases, it's based on manual Gatekeeper registration procedure.

Connection ciphering—Part of the Gatekeeper's authentication procedure is connection ciphering service. It provides key distribution, identification and encryption/decryption services to the Gatekeeper and other entities in the system. Service has an option to select ciphering, hashing, key distribution and signature algorithms independently. Key distribution is based on public key cryptography and message ciphering is based on secret key cryptography.

Address translation—The MS-IP Gatekeeper performs E.164 to transport address association and translation. This is done using directory service in the Intranet Location Register which is updated during mobility management procedures, ie., during TMSI reallocation, authentication, identification, IMSI detach, abort, and location updating.

Call control signalling—The MS-IP Gatekeeper can be configured to route call control signalling to the cellular system network or to the local call management entity within the Gatekeeper.

Call management—The MS-IP Gatekeeper maintains also list of ongoing calls and collects call statistics. This information is stored into the Intranet Location Register by the Gatekeeper.

Cellular procedures—The MS-IP Gatekeeper must be able to handle signalling and resource management procedures (BSSMAP resources) specified in GSM recommendation 08.08.

Status control—In order for the MS-IP Gatekeeper to determine if the registered intity is turned off, or has otherwise entered a failure mode, the MS-IP Gatekeeper uses status inquiry to poll the entity at a certain interval.

The MS-IP Gatekeeper may, for example comprise software which uses a Windows NT platform together with some dedicated hardware in the IMC and gateways to fulfil the ITUT's H.323 Gatekeeper specifications, extended with certain mobility management capabilities according to GSM 04.08.

Figure 4:
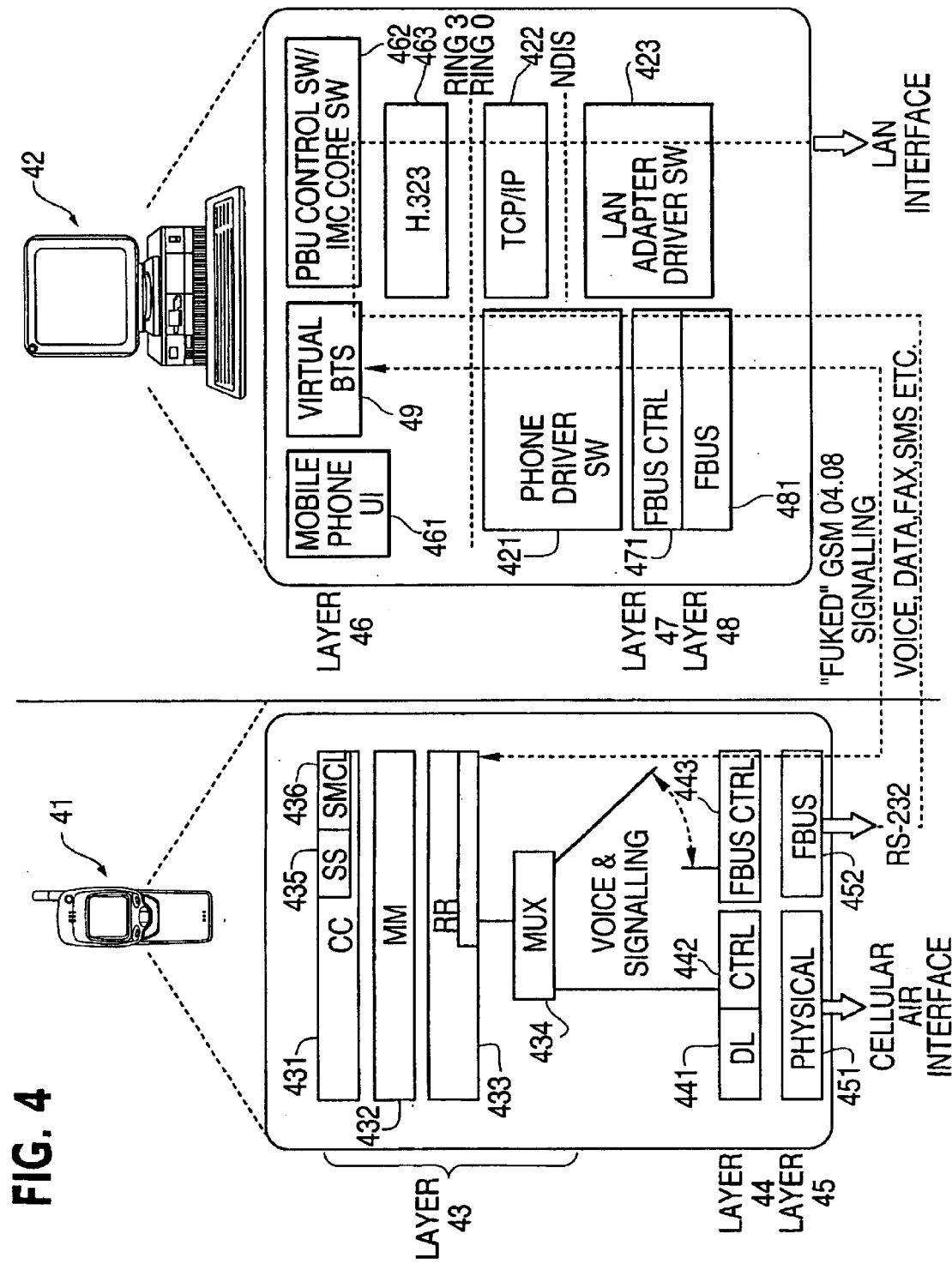
FIG. 4 illustrates the architecture of a mobile station and personal base unit of a wireless intranet office, according to an embodiment of the present invention.

FIG. 4 shows the architecture of a mobile station 41 and a personal base unit, personal computer 42, according to an embodiment of the present invention.

The mobile station 41 and personal base unit 42 are represented showing layers 1 to 3 of the 7 layer OSI reference model, namely physical layer (layer 1), data link layer (layer 2) and network layer (layer 3). (These are data communication protocols whose purpose is to provide a link between 2 communicating devices).

Network layer 43 of the mobile station 41 provides call control management 431 (including supplementary services 435 and short message services 436). This layer also provides mobile management 432 and radio resource management 433. Further, it comprises a MUX which "switches" to a second branch of layer 2 to demand services of the data link (phone bus FBUS) Ctrl 443) and physical layer (FBUS 452) when the mobile station 41 and the personal base unit 42 are "connected". In any event, the network layer demands the services of the data link layer 44 (data link 441 and control 442) and the physical layer 45 of the first branch, to allow the mobile station 41 to perform and report its measurements about the surrounding GSM network (neighboring BTSs) and thus comply with GSM requirements.

Turning now to the personal base unit 42, this PBU comprises a phone driver implementing the physical and data link layers 48 and 47 (FBUS 481 and FBUS Ctrl 471). The network layer 46 of the PBU comprises a PBU control/ IMC core control 462 and an H.323 protocol entity 463 which provide protocol conversion between GSM and H.323. The conversions are needed for GSM layer 3 signalling messages while the speech is carried as GSM coded in the whole while this intranet office network. The PBU further comprises TCP/IP entity 422 and a local area network adapter driver for the 23 for interfacing with the local area network. The PBU control 462 comprises a virtual BTS 49 for communicating with the network layer 43 of a mobile station 421.

This figure shows layers 1 and 2 of the second branch of the mobile station and the PBU as a phone bus (FBUS). This is because, in this embodiment an RS 323 serial connection is used. However, it is evident to a person skilled in the art that these layers would be implemented using different technologies if, for example, connection is via IR or RF.

The mobile phone also has a user interface 461.

In the network, the mobile station interfaces the intranet mobile cluster and personal base unit entities. The interface to the personal base unit, as can be seen from FIG. 4, uses a modified GSM layer 3 (04.08) signalling in this embodiment. (However, in an alternative embodiment, shown in FIG. 12, the GSM radio resource is not delivered to the PBU from the mobile station. Instead, Bluetooth radio resourcing replaces it as a consequence of part of the virtual terminal being implemented inside the mobile station control software).

The mobile station 41 and PBU 42 operate as follows.

When the mobile station 41 is outside the wireless intranet office environment, it operates as a normal GSM phone. The MUX 434 does not couple the radio resource management entity 433 with the second branch 443, 452. Voice and signalling is transmitted via the data link layer 44 and physical layer 45 over the first (GSM)branch to the cellular air interface.

Also, if the mobile station 41 is within the wireless intranet office, but forms part of an intranet mobile cluster, this same path is taken to the cellular air interface and the information and signalling is transmitted to the GSM BTS of that cluster.

However, when the mobile station 41 is connected to a PBU 42 (for example by an RF 232 serial cable or RF interface) information such as voice, data, fax, SMS etc., is transmitted over the local area network. In this case, the MUX 434 demands the service of the second (LAN) branch layers 1 and 2, and layer 3 of the mobile station 41 is seen to communicate with the virtual BTS 49 of the PBU 42. That is, the information (eg. speech) and GSM layer 3 signalling messages are redirected to the second branch interface. As the mobile station 41 and the PBU 42 are linked, the field strength of the virtual BTS 49 will be greater than that of other BTSs in the GSM network. Consequently handover is made to the virtual BTS 49. After this, the handover signalling relating to this virtual BTS is handled from the MUX through the second branch. When handover has been made, the MUX handles all messages and forwards them to the new host cell through the RS 232 interface etc and "talks" to the other BTSs (as is conventional in GSM) over the first branch. General broadcast traffic is also seen by the mobile station 41, for example from layers 1 and 2 to the MUX and from there through the mobile station/PBU interface to the virtual BTS 49.

While in this mode, the speech and layer 3 signalling are routed to the personal base unit, and the radio resource management entity at layer 3 remains connected to the GSM layer 2 (441), that is branch 1. As mentioned above, this is so that the mobile station can act as required by GSM (for example by measuring the RSSI for neighboring BTSs etc.).

The parameters in the virtual BTS 49 within the IMC core are set in such a manner that the terminal is forced to remain clamped to this virtual GSM cell. This avoids possible handovers to any other GSM cells the mobile station might hear.

The operation of the MUX can also be explained as follows. When the mobile station changes to "LANdline" mode (for example when the other interface is connected), the MUX communicates with the new BTS in a similar way to as it does to other BTSs to which it is not connected. In this phase, the mobile station notices that the field strength of the new BTS relating to this new interface is more powerful than the field strength of other BTSs, and hence makes the handover to this BTS. After the handover, signalling relating to the new BTS are handled by the MUX through the new interface, and the mobile station keeps on listening these and sends measurement reports to virtual BTS General broadcast traffic is also sent to the new mobile station, for example from the lower stage to the MUX and from there through the new interface to the virtual BTS.

Figure 5:
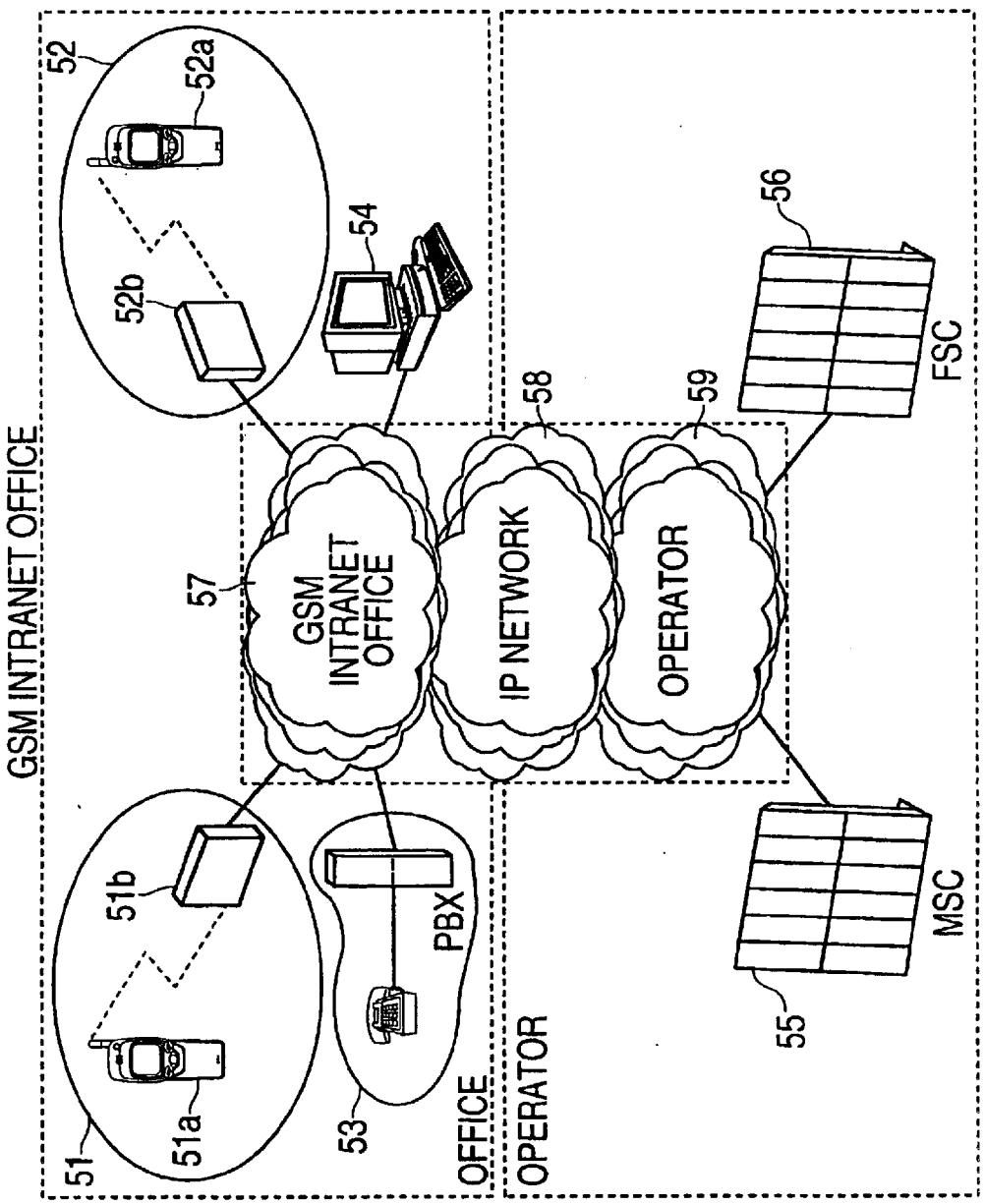
FIG. 5 illustrates a general GSM intranet office concept.
Figure 8:
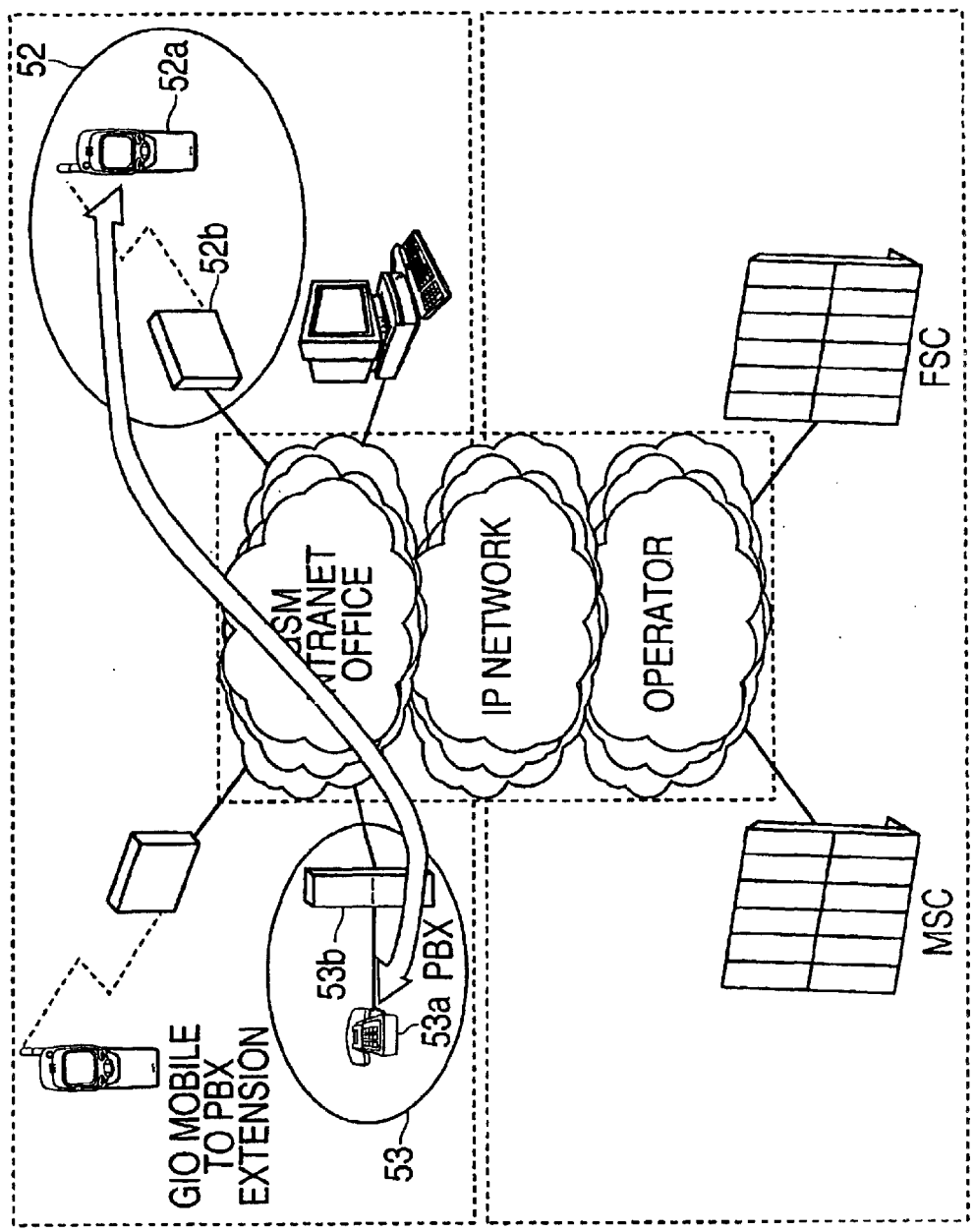
Figure 9:
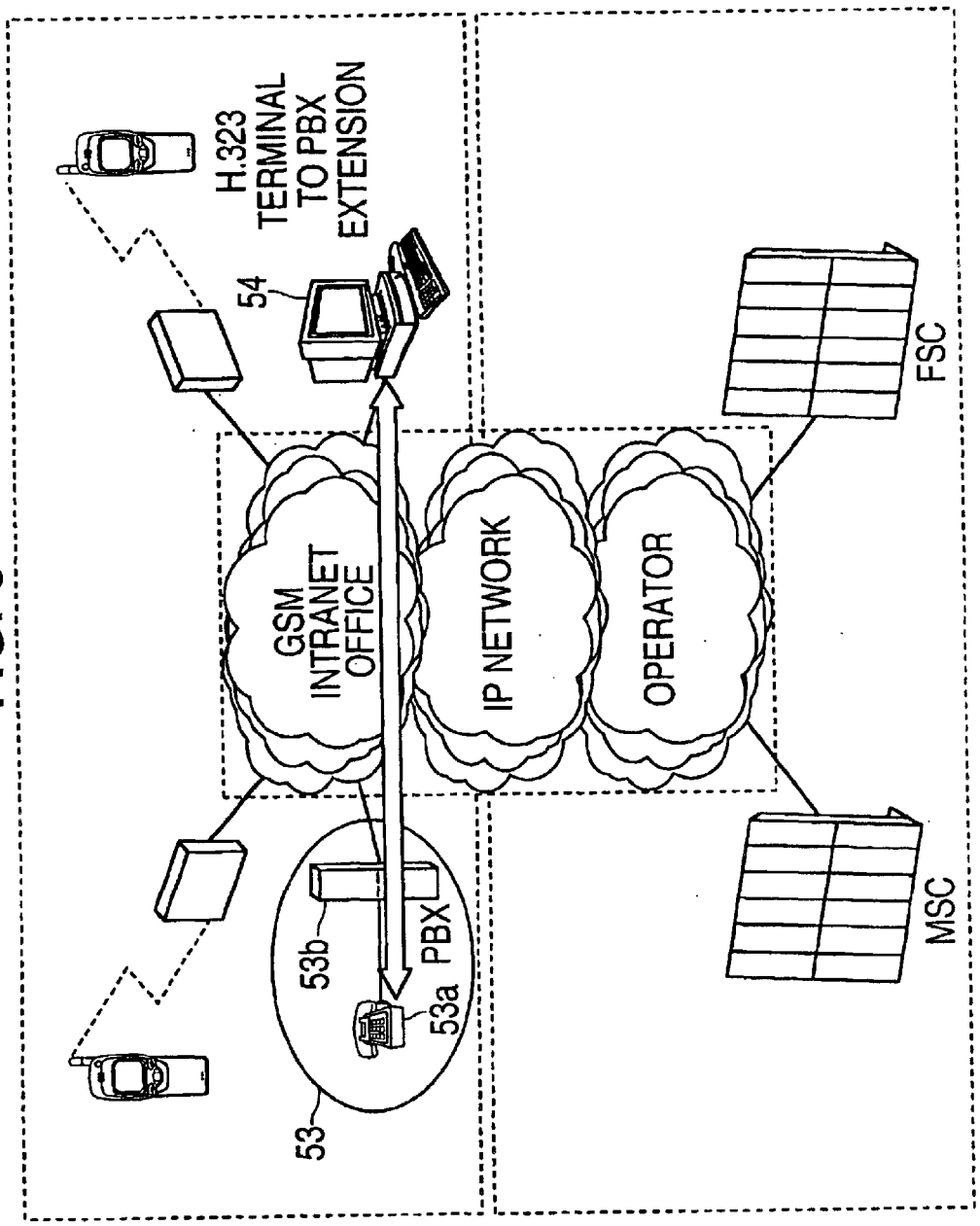
Figure 10:
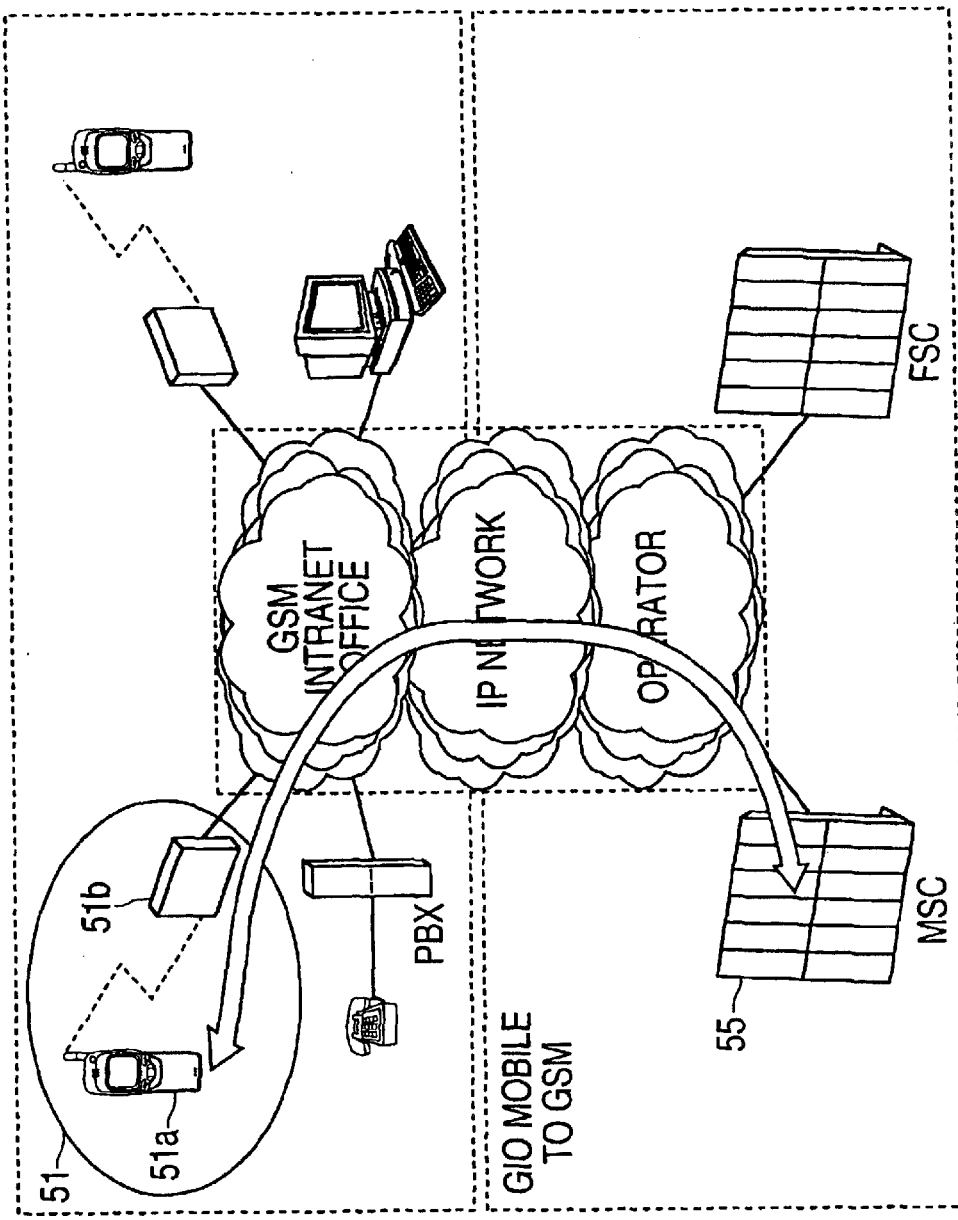
Figure 11:
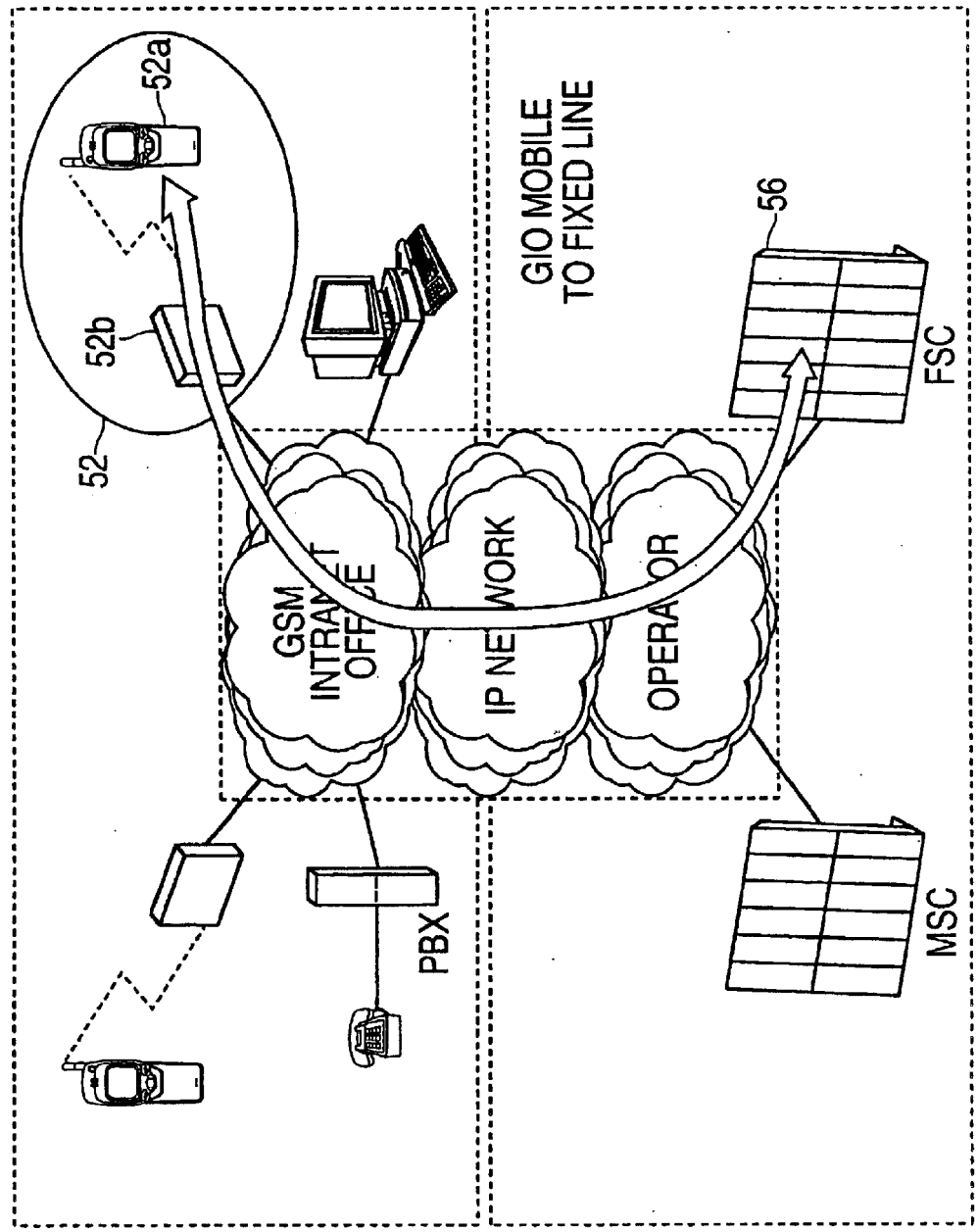

FIG. 5 shows a general GSM intranet office concept, and FIGS. 6 to 11 show information flow between terminals—FIGS. 6 to 9 being within the office environment and FIGS. 10 and 11 extending to outside the environment.

FIG. 5 shows the GSM intranet office 57 comprising different terminal arrangements 51 to 54. The intranet office interfaces with an internet protocol network 58, which is partially situated within the office and partially at the operators location. The operator 59 controls transfer of information between the IP network 53 and network switching centres, such as mobile switching centres 55 and fixed line switching centres 56.

Terminal arrangements 51 and 52 comprise a mobile station 51a, 52a and a BTS Emulator 51b, 52b. These mobile stations can be within an intranet mobile cluster or can be coupled to a personal base unit comprising a virtual BTS.

Figure 6:
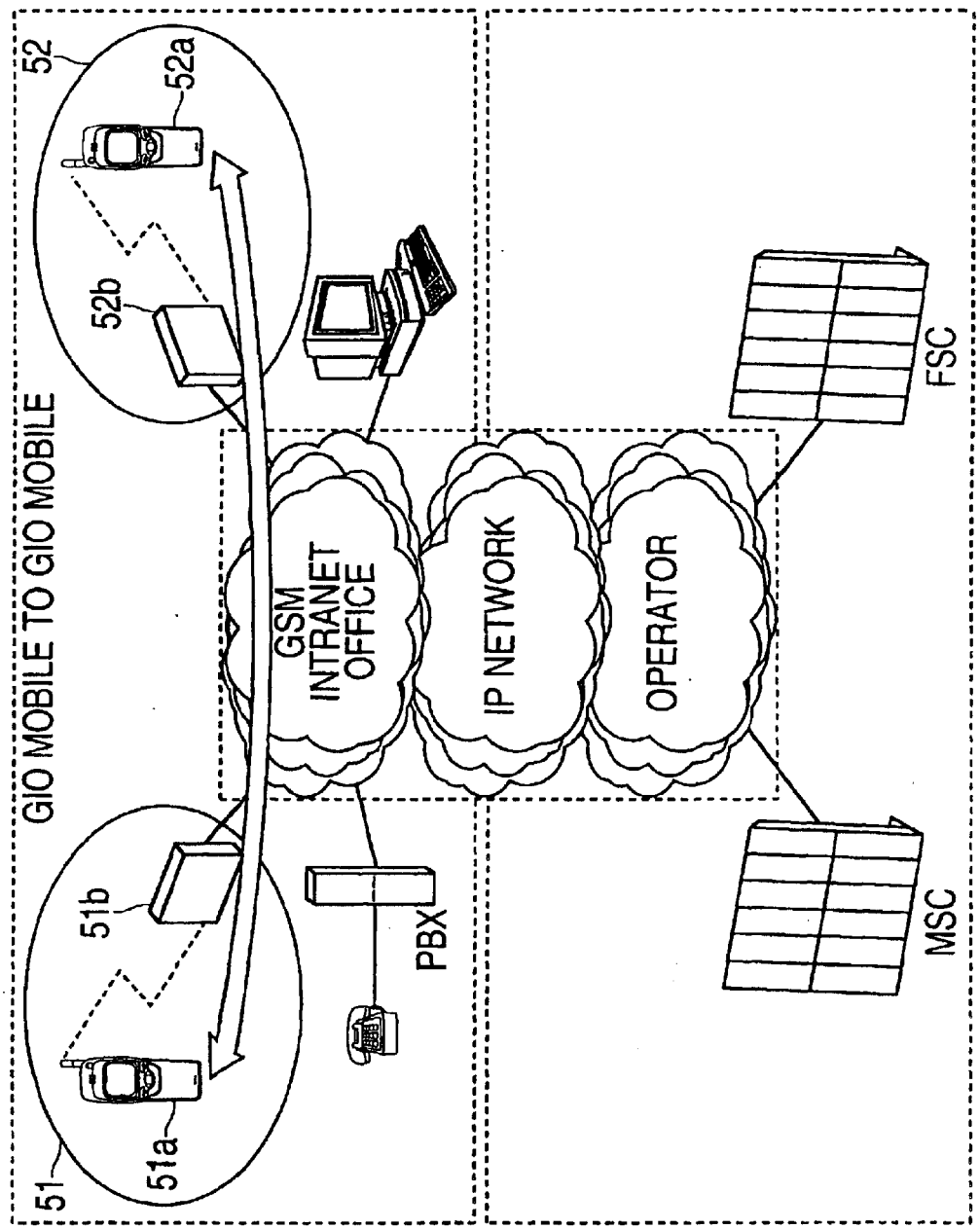
FIGS. 6 to 11 show information flow from terminals of a GSM intranet office according to an embodiment of the present invention.

FIG. 6 illustrates a call between mobile stations of the same office. In this case, the call might be sent by mobile station 51a to mobile station 52a. The information is transmitted from mobile station 51a to BTS emulator 51b and on to the LAN via the inter-working unit. The local area network then transfers the information to BTS emulator 52b which in turn forwards it to mobile station 52a.

Figure 7:
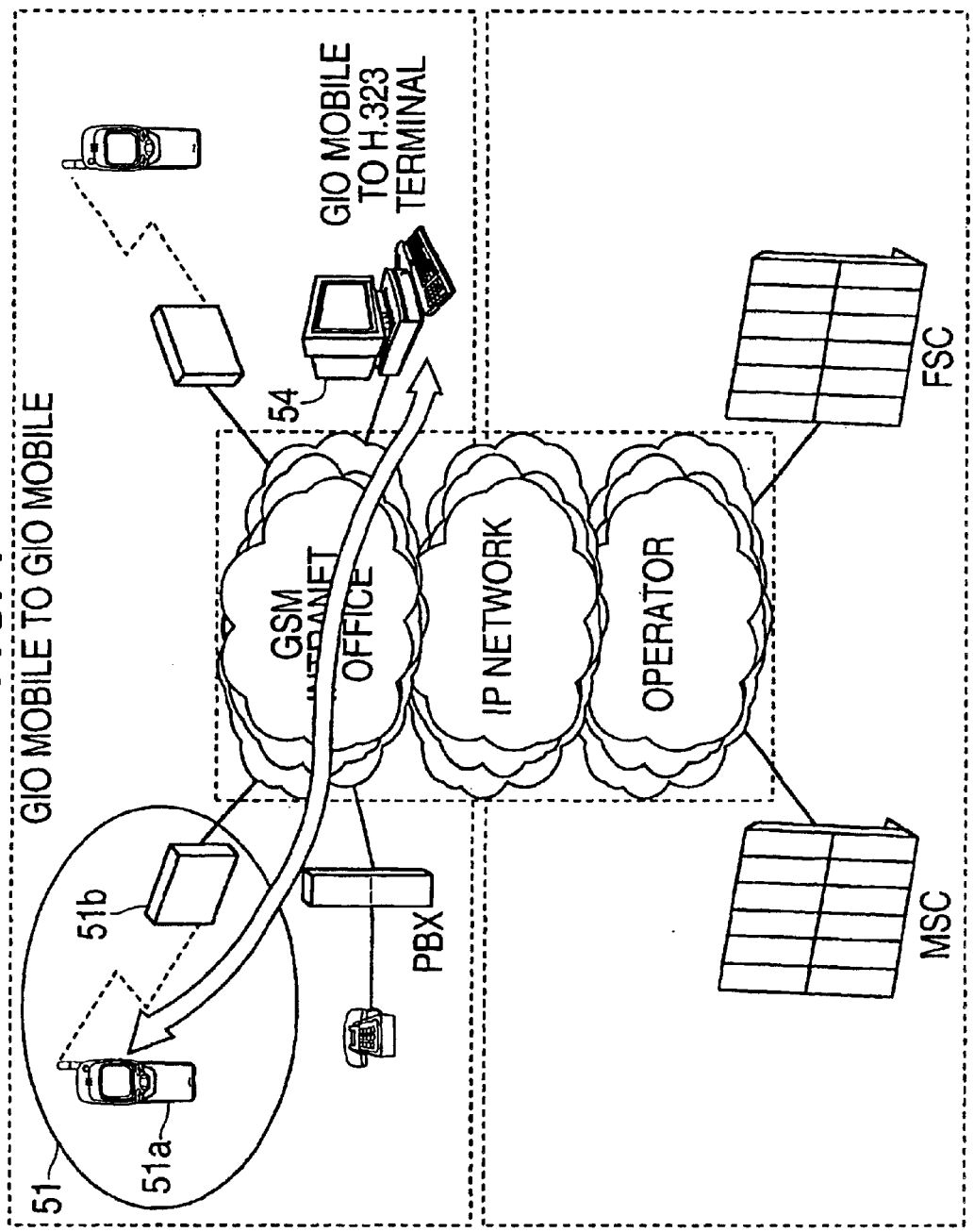

FIG. 7 shows a call between a mobile station 51a and an H.323 terminal 54 within the same office. Information transferred from mobile station 51a will be forwarded to the LAN in the same manner as in FIG. 6 (ie via BTS Emulator 51b and the WIO inter-working unit). The LAN the transfers the information to the terminal 54.

FIG. 8 shows a call between a mobile station 52a and a fixed line extension 53a of a private branch exchange 53b the same office. Again, information is transferred from mobile station 52a to a local area network via BTS Emulator 52b and the office IWU. The information is then transferred over the local area network via a PSTN gateway to PBX 53b. This PBX then switches the information to the requisite extension 53a.

FIG. 9 shows a call between a H.323 terminal and a PBX extension of the same office. In this case, there is no GSM connection. Information is forwarded to the local area network from the terminal 54 where it is transferred to PBX 53b via the local area network on a PSTN gateway. The PBX 53b then switches the information to the requisite extension 53a.

FIG. 10 shows a call between a mobile station 51a of the WIO to the mobile network. In this case, information is transferred from mobile station 51a to the local area network via the BTS Emulator 51b and the inter-working unit. It is then transferred across the local area network and to a mobile switching centre 55 via an A-gateway.

FIG. 11 shows a call between a mobile station 52a of the WIO and a fixed line network. In this case, information is transferred from mobile station 52a to the local area network via BTS Emulator 52b and the inter-working unit, The information is then transferred over the LAN to a fixed line switching centre 56 via a PSTN gateway.

In the information transfer system according to the invention, information transfer connections based upon ATM and GSM technologies may been utilized. Furthermore, it is fully possible to utilize instead of these techniques other kind of information transfer connections. For example it is possible to arrange, instead of the ATM system, the information transfer connections between terminal devices 40 to 43, teleservers 60, 61 and network server 90 entirely e.g. using systems based upon Ethernet and Token Ring or future wide band networks. Correspondingly it is possible to realize, instead of GSM-system, an information transfer system according to the invention even in connection with other mobile communication systems, such as e.g. TDMA (Time Division Mutiple Access), CDMA, W-CDMA AMPS (Advanced Mobile Phone Service) and NMT (Nordic Mobile Telephone) systems.

Moreover, it can be transferred over WATM, 802.11 and mobile IP, which allows the network entities (PBU, IMC, etc.) being mobile. This enables, for example, forming a WIO cluster/IMC into a train or airplane.

Figure 12:
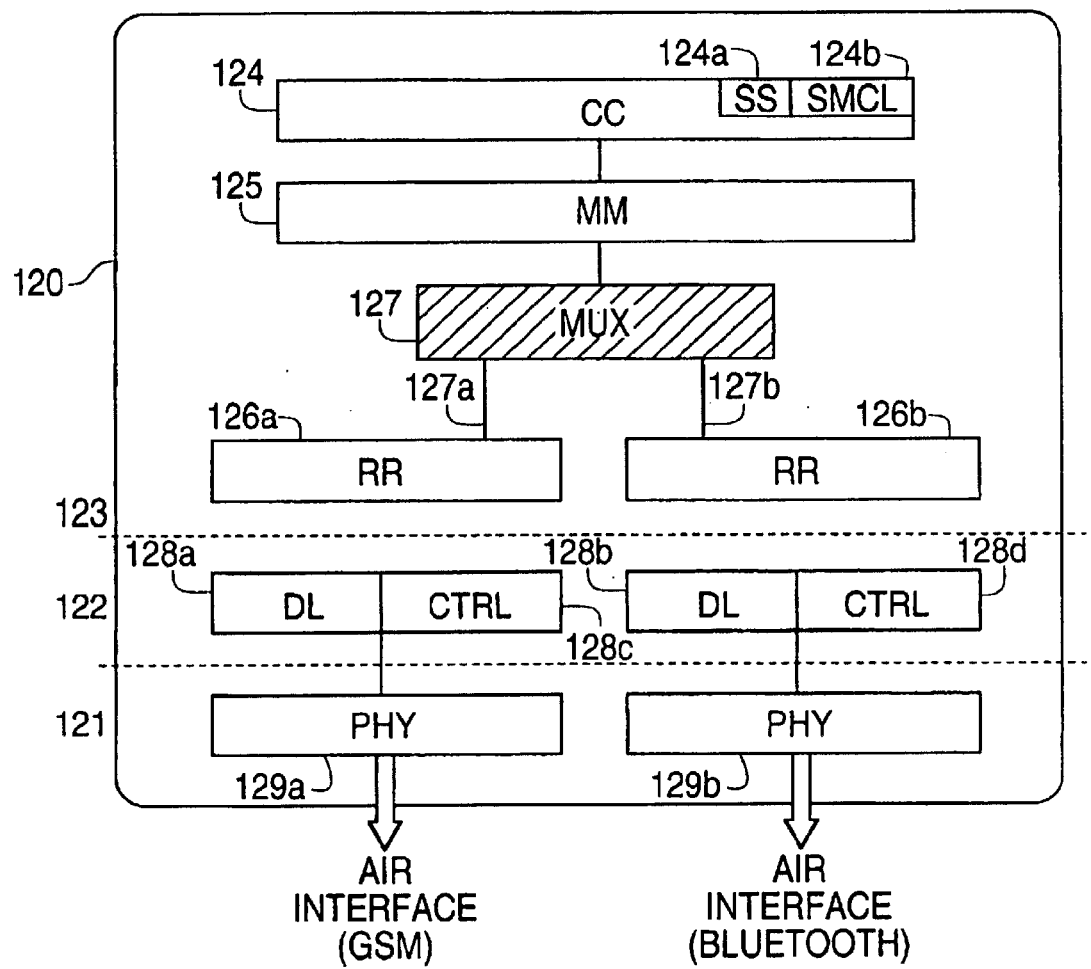
FIG. 12 illustrates the architecture of a mobile station according to a further embodiment of the present invention.

FIG. 12 shows the architecture of the mobile station 120 according to another embodiment of the present invention. This mobile station is provided with both GSM and LPRF (Bluetooth) parts (processors, RF parts etc), and communicates with the public mobile network using GSM, and the PBU of the WIO network using LPRF (Bluetooth). An example of communication using Bluetooth is described below with reference to a user terminal and PBU in FIG. 14.

The mobile station 120 of this embodiment is represented showing layers 1 to 3 namely physical layer (layer 1) 121, data link layer (layer 2) 122 and network layer (layer 3) 123.

Network layer 123 of the mobile station 120 provides call control management 124 (including supplementary services 124a and short message services 124b) and mobile management 125. That is, these layer 3 network management services are common to both GSM and Bluetooth modes of operation. This network layer further comprises a multiplexer, MUX 127, which demands services of the layer 3 radio resource management 126 and also of the lower layers 121, 122. In this embodiment the MUX 127 connects to a second branch of layer 3, to the Bluetooth radio resource management 126b, to demand services of the Bluetooth radio resource management 126b, data link (DL and CTRL 128b, 128d) and physical layer 129b, when the mobile station 120 is within the wireless intranet office environment. The call control and mobility management functions 124 and 125 of the network layer also demand of the services of the GSM radio resource management part 126a. the data link layer (DL CTRL 127a, 128a) and the physical layer 129a of the first branch via the MUX 127. This allows the mobile station 120 to perform and report its measurements about the surrounding GSM network (neighbouring BTSs) and thus comply with GSM requirements and also to communicate with a virtual BTS within the WIO if applicable.

When the mobile station 120 is outside the wireless intranet office, the common network layer functions demand the services of the layer 3 GSM radio resource management 126a and services of the lower layers 128a, 128c, 129a of the first branch (GSM branch).

Figure 13:
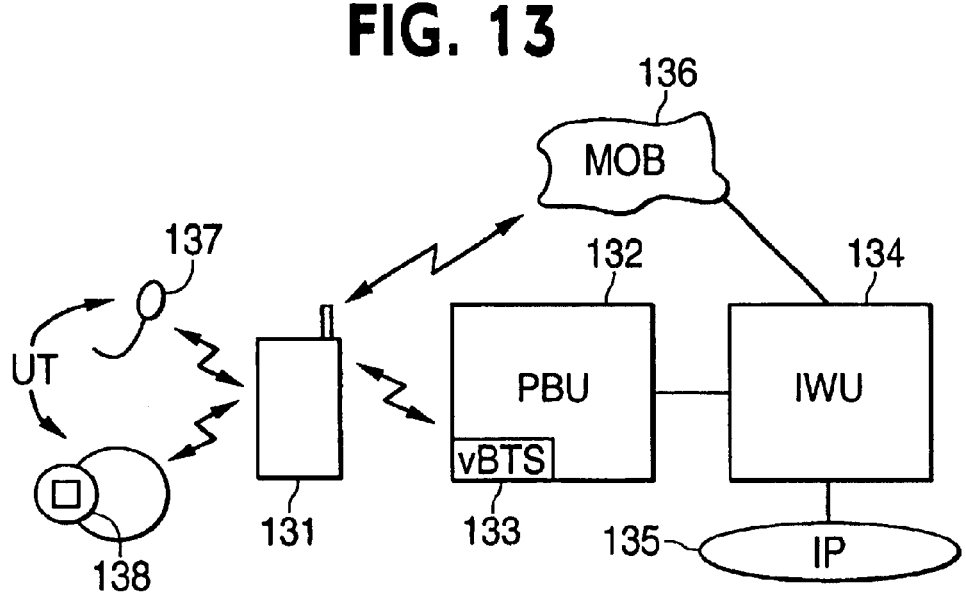
FIG. 13 illustrates a wireless intranet office system according to an embodiment of the invention in which the user is provided with a handsetless user terminal which communicates with his mobile station.

FIG. 13 illustrates a wireless intranet office arrangement according to another embodiment of the invention.

In this arrangement, a mobile station 131 connects to a PBU 132 which may, for example, be a personal computer. The PBU 132 comprises a BTS emulator in the form of a virtual BTS 133. A radio connection is shown (e.g. infrared or LPRF) between the mobile station and PBU, but the connection may be of a different type such as a wired connection. The mobile station 131 is connected to an IP LAN 135 and mobile communications network 136 by virtue of an IWU 134. The IWU may comprise several entities such as a GSM/IP gateway, an intranet location register, a WIO gatekeeper and a WIO A gatekeeper, as mentioned above with reference to FIG. 2. Rather than having to carry the mobile station around the user is provided with a user terminal in the form of a wireless headset 137 and wristwatch user interface 138. The wireless headset 137 connects to the mobile station 131 over an air interface using LPRF remote audio protocol (e.g. Bluetooth), and the wristwatch UI 138 is similarly connected over the air interface using LPRF remote user interface protocol (e.g. Bluetooth).

The mobile station 131 of this embodiment, like that of FIG. 12 has both GSM and LPRF (e.g. Bluetooth) parts. However, as explained above, in this embodiment Bluetooth is used for communication between the mobile station 131 and the user terminal 137, 138, as opposed to between the mobile station 131 and PBU 132. Consequently, the mobile station's protocol stack will differ from that shown in FIG. 12. More specifically, the Bluetooth physical layer 129*b* will couple to the air interface of the user terminal as opposed to that of the PBU. Moreover, layers 1 and 2 of the GSM protocol stack will be distinguished. That is, this first branch 127*a* is further divided by the provision of a MUX between layers 2 and 3 as shown in FIG. 4, depending on whether an interface is required to a GSM BTS or to a virtual BTS within a WIO environment.

When the handset 131 is outside the wireless intranet office environment, the handset 131 operates as a normal GSM phone. That is, MUX 127 connects to the GSM radio resource management 126*a* and the GSM lower layers 121 and 122 to obtain connection to a public GSM BTS. The other layer 1 and 2 stack linking to the virtual BTS would be disconnected as described above with reference to FIG. 4.

Optionally, the MUX 127 may also make connection to the Bluetooth radio resource management 126*b*, for example if the user selects an option to use user terminals 137, 138 within the GSM environment.

When the handset enters the wireless intranet office environment, on the other hand, the MUX 127 may effect a connection so that the call control and mobility management functions may demand services of the Bluetooth radio resource function and layers 1 and 2, 126*b*, 128*b*, *d*, 129*b*, either automatically or upon user selection. Such connection enables the provision of a communication channel between the mobile station 131 and the user terminal 137, 138. To effect a link between the mobile station and PBU 132, the MUX 127 connects the GSM radio resource function 126*a* to the common layer 3 functions, namely call control 124 and mobility management 125. The GSM radio resource function 126 will demand service of layers 1 and 2 of the stack for linking with the PBU when in this wireless intranet office environment. Further, the GSM network will require signalling updates. Hence, layers 1 and 2 linking to both the GSM, BTS air interface and PBU air interface are connected.

FIG. 14 shows an alternative embodiment of the invention, in which user terminals 137, 138 communicate directly with a personal base unit, when in the wireless intranet office environment. The system is similar to that shown in FIG. 13, but with one major difference. When the mobile station 131 is in the wireless intranet office environment, its functionality is transferred to the PBU 132. That is, the PBU 132 then comprises a virtual mobile station 139, as will be explained further below. As a consequence, the user terminal 137, 138 can communicate directly with the PLU 132, thereby eliminating the need for the mobile station to remain turned on.

When the mobile station MS changes over to the WIO mode, the mobile station 131 transfers the dynamic data relating to the state of the mobile station and the calls in progress to a virtual terminal vMS 139, which is established in the PBU 132.

This data is maintained in a state machine, which is located in the virtual terminal. In this context, the state machine means a functional entity that describes the allowed changes in the state relating to the functioning of the mobile station and the related messages according to the protocol. The functionality described by the state machine maintains the data on the possible changes in the state relating to said protocol layer, the instantaneous state the data structures relating to the change in the state, etc. Thus, a state machine in connection with the GSM means the mobile station's functionality related to the mobile station's GSM Layer 3 protocol (NULL, current switched on, switched to a base station, etc.) In addition, said state machine in the higher level maintains a partial state machine for the mobile station's every connection, whereupon the state of the connection can be, for example, NULL, call initiated, call proceeding, active, etc.

The protocol stack of the virtual terminal vMS in PBU may comprise the GSM functionality described by a state machine 105, which comprises at least a radio resource (RR), mobility management (MM) and call management (CM), i.e. functions related to protocol layer. It may also comprise an additional protocol 106 relating to communication between the PBU and the user terminal operating in the WIO mode (e.g. the Bluetooth functionality). This will be discussed later in more detail.

When the PBU has the use of the data of the state machine, the PBU starts the virtual terminal vMS, which emulates the functioning of the actual mobile station MS towards the mobile communication system. It receives signals from the mobile communication network and, on the basis of the status data it maintains, it carries out signalling towards the mobile communication system, either independently, or according to the information it requests from the user terminal UT in WIO mode. It should be noted that since the state machine during WIO mode is maintained by the virtual terminal, the signalling to be implemented in different directions is independent, which means that changing of the protocol in either direction does not interrupt the functioning of the vitual terminal.

The flow diagram presented FIG. 15 illustrates the functioning of a virtual terminal on the basis of a message arrived from a mobile communication network. In step 110, the virtual terminal vMS receives a message from the mobile communication network MOB. In step 111, the virtual terminal vMS compares the contents of the message to the state machine it maintains and, on the basis of it, defines the message required for changing over to the next state. In step 112, the virtual terminal defines whether a connection to the user terminal UT that operates in the WIO mode is required for generating the next message or whether the required data is available in the inter-working unit. If a connection to the user terminal UT is necessary, the virtual terminal generates the message relating to said function (step 113) and sends it through the IP network to the user terminal UT (step 114). At the same time, it updates the state of the process in question to the signalling state maintained by it (step 115). If no connection the user terminal UT is required and the virtual terminal concludes that the necessary signalling can be managed by itself, the virtual terminal checks whether the subscriber information stored in the PBU is required for the reply or whether the reply message can directly be generated on the basis of the status data (step 116). If additional information is required, the virtual terminal retrieves it from PBU's memory (step 117) and, on the basis of it, generates a message to be transmitted to the mobile communication system (point 118). If no additional information is required, the virtual terminal generates a message in accordance with the mobile communication system's protocol defined on the basis of the status data (step 118). In step 119, the message generated by the virtual terminal is transmitted to the mobile services switching centre. At the same time, the virtual terminal updates the state of the process in question in the state machine it maintains (step 115).

One way of managing a connection between the virtual terminal vMS and the user terminal UT in WIO mode is to convert the GSM signalling into packets in accordance with the IP and to transfer the signalling to the user terminal UT in the GSM format. Anyhow, information transferred between the mobile communication network and the user terminal UT includes a lot of signalling relating to the use of a radio resource. Such traffic in the arrangement according to the invention is substantially unnecessary. Hence in this embodiment, a connection is managed by simplifying the protocol during WIO operation. This kind of protocol can be established, for example, by selecting a group of AT commands, which are transported between the vMS and the MS in WIO mode. For the establishment of a connection, a simple, manufacturer-specific protocol can also be defined.

The implementation of said protocol could be illustrated by giving an example of the different functions, which are needed for communication between the vMS and the UT in WIO mode. These include, for example, the functions 1.1.–1.7. listed in the first column of Table 1. The second column of Table 1 contains a functional description of messages.

TABLE 1

| Reference | Function | Messages |
| --- | --- | --- |
| 1.1 | Making of Call | Request to Call MS->vMS |
| | | Resetting of Request to Call vMS->MS |
| 1.2 | Reception of Call | Indication of Call vMS->MS |
| | | Resetting of Indication of Call MS->vMS |
| 1.3 | Speech | Transport of Coded Speech Over UDP |
| 1.4 | Ringing Out | Request for Switching Off/Indication |
| 1.5 | SMS | SMS Transmission/Reception |
| 1.6 | FAX | Telecopy Transmission/Reception |
| 1.7 | Handover | Handover Message Transmission/Reception (State Machine) |

When a subscriber wants to make a call (1.1), a user terminal UT makes a request for a call and receives the message of the setup of the call given by an vMS, before the transfer of the data relating to the call begins. When the subscriber receives a call (1.2), the user terminal UT receives the message of the incoming call from the vMS and informs the vMS of the reception of the call before the transfer of the data relating to the call begins. When either the subscriber or the other party wants to cut off the call (1.3), the user terminal UT gives or receives a request to cut off the call. On the basis of the protocol, both the user terminal UT and the vMS should be able to distinguish whether it is a question of the transfer of speech (1.4), a short message (1.5) or telecopied data (1.6). The message 1.7 contains the status data on the calls in progress, which are transported when the virtual terminal is taken into use or when the use of the virtual terminal is terminated as described above.

The above-mentioned command group is only one possible way of implementation. For example, making a call can be arranged so that the user terminal UT identifies, on the basis of the first speech packets, that a call is coming in, in which case not even a separate call phase is required. Correspondingly, the vMS can automatically adapted to cut off the call when the reception of the call packets from the user terminal UT stops. With a simple command group, it is possible to implement adequate functions by means of which the user terminal UT that operates in the WIO mode can utilise the mobile communication network's services, though part of the signalling is managed elsewhere.

Referring back to FIG. 14, when a user enters the office carrying his traditional user terminal UT handset, the phone indicates that LPRF LAN access is available. When the subscriber so wishes, he/she can e.g. plug the handset into an intelligent charger such as described in PCT Publication Number WO98/15143, and thus enable "handsetless operation" using merely the wrist UI and wireless headset. In such an operation, the traditional terminal is inactive and the virtual terminal acts as a mobile station towards the mobile communication network. The traffic between the lightweight terminal and the virtual terminal is carried out through LPRF connection using the specific protocol layer as described earlier. While in office, he/she can walk around the LPRF coverage area and use GSM services without the handset. When leaving the office he/she can enter normal cellular operation by just taking his/her handset along and even continue the ongoing call. The invention thus facilitates a completely wearable communications device in office environment with the user identified as the same mobile subscriber as outside office with handset. The phone numbers, user setting, personalised features etc. will remain in both operating modes.

FIG. 16 illustrates the handling of an electronic book service within a wireless intranet office, according to a preferred embodiment of the invention. The system may utilise a dual mode terminal of the invention as is shown for example in FIG. 12. Mobile data services are becoming increasingly prevalent from mobile communications operators. One such service may be electronic book (E-book) purchasing. In this embodiment, E-book purchasing 161 is available through the operator of a mobile communications network 162. The user of mobile station 160 can access this service either via the public mobile network 162, or via the WIO. In the latter case, connection to the mobile network 162 is via PBU 166 and IWU 165 as explained with reference to FIG. 2 above. Similarly, the book required may be downloaded via the public or private networks. In the event that the mobile station 160 is within the public mobile communications area 162 but outside the WIO environment, the book may be stored in the mobile station's memory (or if the mobile station is a portable computer with data card, then it may be stored on the computer's hard disk, for example). Ideally, this is a temporary measure, and the book can subsequently be transferred for storage within the WIO network when the mobile station enters the WIO environment. For example, the user could choose to store the E-book on his PC (PBU 166), or alternatively in an office library 163 of the offices IP LAN 164. Alternatively, if the mobile station is within the WIO environment, the user may request the E-book via the WIO network, and the book may automatically be downloaded to the requested WIO device (e.g. office library 163, or users PC). An advantage of storing an E-book in the office library 163 is that it is accessible to other users of the office. Consequently, if the user's terminals (mobile station, PC etc.) have a suitable browser, the user can search through books, newspapers etc. for desired information. If the user's terminal is a PC, then a conventional IP browser may be used. Alternatively, if the user's terminal is a mobile station 160, such as a mobile phone, then it is preferably provided with a WAP browser so that it may search the contents of the library 163, over a low power RF interface 167 such as Bluetooth.

The above is a description of the realization of the invention and its embodiments utilizing examples. It is self evident to a person skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention. For example, whilst the embodiments refer to intranet offices, it is not restricted to =the intranet, but is also applicable to the internet.

What is claimed is:

1. A dual mode mobile station comprising:

managing means for managing call control and mobility information independently of a mode of operation of the mobile station;

first linking means for linking to an interface of a mobile communication network so as to transfer the call control and mobility information between the mobile station and the mobile communication network, said first linking means comprising a radio resource manager for the mobile communication network;

second linking means for providing a link to an interface of a further communication network so as to transfer the call control and mobility information between the mobile station and the further communication network, said second linking means comprises a radio resource manager for the further communication network; and means for coupling the managing means to the first linking means when the mobile station is in a first mode and to the second linking means when the mobile station is the second mode such that the mobile station remains connected to the mobile communication network, while actual data is carried over the further communication network.

2. A mobile station as claimed in claim 1, wherein the managing means further manages radio resources information independently of the mode of operation of the mobile station.

3. A mobile station as claimed in claim 2, wherein the radio resource management is that of the mobile communication network.

4. A mobile station as claimed in claim 1, wherein the second linking means comprises a low power RF radio resource.

5. A mobile station as claimed in claim 4, wherein the low power RF radio resource is Bluetooth.

6. A mobile station as claimed in claim 1, wherein the call control and mobility management is that of the mobile communication network.

7. A mobile station as claimed in claim 1, wherein the mobile communication network is a GSM network.

8. A mobile station as claimed in claim 1, further comprising a radio resource manager for a user terminal, and linking means for linking to the interface of the terminal device so as to transfer radio resource information between the mobile station and the user terminal.

9. A mobile station as claimed in claim 1, further comprising a browser.

* * * * *